3,445,403
ENHANCED CURE OF SELF-CURING ACRYLATE RUBBER COMPOSITIONS

Harold A. Tucker, Shaker Heights, and Henry J. Essig, Westlake, Ohio, assignors to The B. F. Goodrich Company, New York, N.Y., a corporation of New York
No Drawing. Continuation-in-part of application Ser. No. 292,128, July 1, 1963. This application Sept. 13, 1966, Ser. No. 578,994
Int. Cl. C08f *15/40, 45/72, 45/34*
U.S. Cl. 260—23                     5 Claims

ABSTRACT OF THE DISCLOSURE

Heat curable acrylate elastomers prepared with from 0.2 to 2.5% of an N-substituted alkoxy methyl acrylamide or methacrylamide, 0.2 to 3.8% of another unsaturated amide, and lower alkyl esters of acrylic acid, are more readily cured when they contain organic acids. Such cured compositions also have improved heat aging properties when the acrylate elastomer also includes as a compounding ingredient a polyalkylene glycol.

---

This is a continuation-in-part of our copending application, Ser. No. 292,128, filed July 1, 1963, and now abandoned.

This invention relates to heat curable acrylate rubbers and elastomers and particularly relates to the use of acidic materials to enhance the cure rate of self-curing rubbery interpolymers comprised of a major proportion of a lower acrylic ester and/or a particular methacrylic ester and minor amounts of an N-alkoxymethyl acrylamide and another acrylamide.

While such novel rubbery interpolymers are self-curing and yield elastomers which have good physical properties with respect to oil resistance, oil aging, and low temperature flexibility and have unexpectedly good tensile strength, elongation, compression set, thermal stability and air aging characteristics, the cure rate can be greatly enhanced through the use of certain acidic additives when mixed with the self-curing acrylate interpolymers prior to heating to induce the self-curing reaction.

The acidic materials which may be used for this purpose are preferably organic acids which have boiling points greater than 100° C. and preferably greater than 150° C. Such organic materials may either be in the form of the free acid or in the form of derivatives or compounds which generate or release acid groups during the curing reaction. Preferably, the organic copounds contain carboxyl or sulfonic acid groups or precursors thereof. Typical examples of such materials containing carboxyl groups which have been found useful are stearic acid, lauric acid, palmitic acid, benzoic acid, phthalic acid, isophthalic acid, terephthalic acid, salicylic acid, and the like. Preferred are aromatic acids or aliphatic acids containing 12 to 20 carbon atoms, both mono- and polycarboxylic acids can be used. Anhydrides such as phthalic anhydride and maleic anhydride may be used as well as acid salts which decompose at temperatures greater than 100° C. The other major group of organic acid curing aids are sulfonic acids or precursors thereof such as the sulfonates or sulfones; for example, toluene sulfonic acid, butadiene sulfone, morpholinium toluene sulfonate, benzene sulfonic acid, naphthalene sulfonic acid and the like. We have also found, although they are not as desirable as the organic acids, that acidic carbon blacks or acidic clay fillers which are well known may be used as curing aids. Such carbon blacks or clay fillers have a pH below about 5.

The amount of organic acid curing aid employed may be varied from about 5 to 100 millimols per 100 parts of polymer. On a weight basis, from about 0.05, preferably 0.1, to about 3 parts per 100 parts by weight of rubber or elastomer and is added along with any other compounding agents in conventional rubber mixing equipment.

The compositions of this invention are rubbery interpolymers obtained by polymerizing in aqueous emulsion, or in solution, a mixture of monomers comprising (A) 0.2 to 2.5% of an N-substituted alkoxymethyl acrylamide or methacrylamide, (B) up to 3.8%, preferably 0.2 to 2.5%, of a monoolefinically and terminally unsaturated amide containing at least one hydrogen on the amide nitrogen and wherein the olefinic unsaturation is alpha-beta to the carbonyl group of the amide and the remainder of the molecule consists only of carbon and hydrogen atoms, and (C) the remainder comprising one or more rubber-producing lower alkyl esters of acrylic acid or rubber-producing alkyl esters of methacrylic acid, said percents being by weight and based on the total weight of the monomeric mixture, the total of the (A) and (B) constituents not exceeding about 4%. The interpolymers have second-order transition temperatures which are not greater than about 10° C.

The lower acrylic esters embodied in the interpolymers of this invention and comprising the major constituent thereof are those derivatives of acrylic acid represented by the structure

wherein R is a member of the class consisting of alkyl groups having from 1 to 12 carbon atoms, preferably 2 to 8 carbon atoms, the beta-cyano ethyl radical and cyano alkyl groups having from 4 to 12 carbon atoms, preferably 4 to 8. Representative, acyclic, lower alkyl acrylic esters are methyl acrylate, ethyl acrylate, the propyl acrylates, the butyl acrylates, the amyl acrylates, the hexyl acrylates, the heptyl acrylates, the octyl acrylates, e.g. n-octyl and 2-ethylhexyl acrylate, decyl acrylate, and lauryl acrylate; the rubber-producing cyanoalkyl acrylates, the polymers of which have second order transition temperatures not greater than 10° C., such as beta-cyano ethyl acrylate having the structure

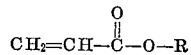

the alpha, beta and gamma-cyano propyl acrylates, the cyanobutyl acrylates, the cyanoamyl acrylates, the cyanohexyl acrylates, the cyanoheptyl acrylates, and the like. The most preferred acrylic esters in the present invention are ethyl acrylate, butyl acrylate and β-cyano ethyl acrylate.

The rubber-forming, acyclic, methacrylic esters embodied herein which can be used in lieu of the above acrylic esters or in mixtures therewith are those derivatives of methacrylic acid represented by the structure

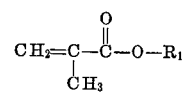

wherein $R_1$ is an alkyl group selected from those containing from 5 to 14 carbon atoms. Suitable methacrylic esters include the amyl, the hexyl, the heptyl, and the octyl methacrylates, decyl methacrylate, lauryl methacrylate and myristyl methacrylate.

The monoolefinically unsaturated amides which are incorporated in the interpolymers of this invention in minor proportions, i.e., 0.2 to 3.8 weight percent, include acrylamide, methacrylamide, N-methyl acrylamide, N-t-butyl acrylamide, N-cyclohexyl acrylamide, N-ethyl acrylamide and others containing at least one hydrogen on the amide nitrogen. Preferred are amides having the structure

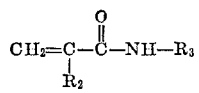

wherein $R_2$ is a member of the group consisting of hydrogen and an alkyl group having from 1 to 4 carbon atoms and $R_3$ is a member of the group consisting of hydrogen and an alkyl group having from 1 to 6 carbon atoms. Most preferred are acrylamide and methacrylamide.

The polymerizable N-alkoxymethyl acrylamides utilized in minor proportions, i.e., 0.2 to 2.5 percent by weight of the interpolymer, have the structure

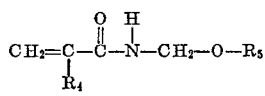

wherein $R_4$ is selected from the group consisting of hydrogen and methyl, and $R_5$ is an alkyl group having from 1 to 8 carbon atoms. It is thus intended that where references are made herein regarding the essential N - substituted alkoxymethyl amides, the term "acrylamide" includes "methacrylamide" within its meaning. The preferred alkoxymethyl acrylamides are those wherein $R_5$ is an alkyl group containing from 2 to 5 carbon atoms and most preferred is N-butoxymethyl acrylamide.

The amount of N-alkoxymethyl acrylamide in the interpolymer is critical. There must be at least 0.2% but if it is present in excess of about 2.5% by weight, the resulting elastomer has inadequate elongation. The aforementioned amide component, exemplified by acrylamide and methacrylamide, is also a "reactive monomer" which is included to promote faster curing of the elastomeric interpolymer and also to yield a product having better permanent set and high temperature aging properties. The total of the reactive monomers, that is the amide plus the N-alkoxymethyl acrylamide, is critical and should not exceed about 4% of the interpolymer composition. If greater amounts are present, the ultimate elongation of the cured elastomer (vulcanizate) is unacceptable.

The N-alkoxymethyl acrylamides embodied herein are lower alkyl ether derivatives of N-methylol acrylamide. Their advantages as a self-curing component in acrylate rubbers are surprising and unexpected when a comparision with similar rubbers containing the hydroxymethyl amide self-cure monomer is made. The elastomers of this invention have comparatively negligible gel content (indicating relatively little cross-linked structures). Their scorch properties are markedly better, permitting a controllable cure rate. This enables the material to be compounded, molded and cured by conventional processing methods. Excellent high-temperature aging properties are inherent in the elastomers having this highly compatible "built-in" cure system.

One method of obtaining the above-described N-alkoxymethyl substituted unsaturated amides is described in detail in U.S. Patent No. 3,079,434. The more preferred method for preparing the N-alkoxymethyl amide involves a direct etherification of the N-hydroxymethyl unsaturated acrylamide (N-methylol acrylamide or N-methylol methacrylamide) by reaction with an alcohol, $R_5OH$ employed in stoichiometric excess. A small amount of an acid catalyst is used, such as sulfonic acid or p-toluene sulfonic acid, and a small amount of polymerization inhibitor is included in the mixture, for example, pyrogallol, or the hydroquinones, or any of those listed in U.S. 3,079,434. The reaction is depicted below:

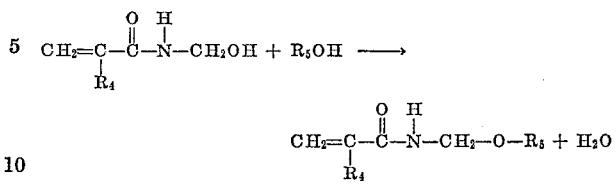

wherein the R's have the designations previously assigned thereto. In order to obtain high yields, the water of reaction is removed by azeotropic distillation employing well known azeotropic agents such as benzene or toluene. Consequently, the etherification is desirably carried out at the reflux temperature of the particular system, preferably at about atmospheric pressure.

The N-alkoxymethyl acrylamide of this invention should be substantially free of contaminants, for example, unreacted acrylamide and undesired by-products formed during the reaction, such as the methylene bis-acrylamides and other harmful difunctional products. An unreasonable amount of these impurities, more than about 0.3 wt. percent causes undue cross-linking in the interpolymers and high gel contents therein.

The monomeric mixture which is polymerized to give the rubbery compositions of this invention may contain a minor amount of one or more monoolefinically unsaturated monomers copolymerizable with the aforementioned acrylic acid or methacrylic acid ester. Suitable monoolefinically unsaturated monomers contain one

grouping or one —CH=CH— grouping. Representative compounds of this type are the vinyl cyanides such as acrylonitrile, methacrylonitrile, vinylidene cyanide, resin-forming methacrylates such as methyl methacrylate and butyl methacrylate, alpha-cyano methyl acrylate having the structure $CH_2$=CH—$COOCH_2CN$, alpha-cyano ethyl acrylate having the structure

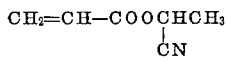

other vinyl and vinylidene monomers such as vinyl chloride, vinylidene chloride, styrene, the vinyl ethers, the vinyl esters, vinyl pyridine, ethylene, propylene, acrylic acid, methacrylic acid, maleic, fumaric, and itaconic acids and their alkyl esters, and the like.

The amount of this optional, copolymerizable, monoolefinically unsaturated monomer which may be used in the recipe is generally less than 40 percent by weight of the monomeric mixture and ordinarily is less than 20%. If it is desired to employ such a comonomer with the acrylic ester to modify certain physical characteristics of the acrylate rubber such as hardness or high temperature performance, the amount thereof must be limited since the polymeric products of the comonomers generally are of a resinous nature. The maximum amount permitted is governed by the effect of said comonomer on the "glass temperature" of the interpolymer.

The temperature at which a polymer changes from a rubbery solid to a brittle substance (the "glass" state), i.e., when it will not tolerate appreciable deformation without fracture, is usually referred to as the "second-order transition temperature" or "glass temperature," and generally is designated by the symbol $T_g$. Details on measuring the second-order transition temperature of polymers and the ramifications of this value are given in the books "Principles of Polymer Chemistry," Paul J. Flory, Cornell University Press, Ithaca, N.Y., 1953, pp. 52–53 and 56–57, and in "Monomeric Acrylic Esters," E. H. Riddle, Reinhold Publishing Corp., New York, N.Y., 1954, pp. 59–60. The acrylate interpolymer rubbers of this invention have a glass temperature not above about 10° C., preferably at least 0° C. and below, and the glass temperature may range to as low as −70° C. Listed below are the glass temperatures of some typical acrylate and methacrylate ester homopolymer rubbers.

| Polymer: | Tg, ° C. |
| --- | --- |
| Poly (lauryl methacrylate) | −65 |
| Poly (2-ethylhexyl acrylate) | −55 |
| Poly (butyl acrylate) | −52 |
| Poly (ethyl acrylate) | −22 |
| Poly (octyl methacrylate) | −20 |
| poly (hexyl methacrylate) | −5 |
| Poly (β-cyano ethyl acrylate) | 6 |
| Poly (methyl acrylate) | 3–9 |

The glass temperatures of the acrylate interpolymer rubbers embodied herein, i.e., containing the small but critical amounts of the amide constituent, are comparable to those of the corresponding acrylic homopolymers. If the interpolymer is to contain one or more of the aforesaid monoolefinically unsaturated comonomers, the maximum allowable amount thereof is dependent on the requisite of obtaining an interpolymer having a glass temperature below the aforesaid upper limit. The permissible amounts are easily determined from the glass temperatures of the homopolymers of the acrylates and of the homopolymers of the optional comonomers, Tg values for some typical representatives of the latter being given below.

| Polymer: | Tg, ° C. |
| --- | --- |
| Poly (butyl methacrylate) | 20 |
| Poly (vinyl acetate) | 29 |
| Poly (propyl methacrylate) | 35 |
| Poly (cyclohexyl methacrylate) | 58 |
| Poly (ethyl methacrylate) | 65 |
| Poly (vinyl chloride) | 82 |
| Poly (acrylonitrile) | 97 |
| Poly (styrene) | 100 |
| Poly (methyl methacrylate) | 105 |

A simplified relationship for determining the glass temperature of copolymers is expressed as:

$$\frac{1}{Tg}=\frac{W_1}{Tg_1}+\frac{W_2}{Tg_2}+\frac{W_2}{Tg_n}$$

where $W_1$ and $W_2$ and etc. are the respective weight fractions of the monomers in the copolymer and $Tg_1$ and $Tg_2$ and etc. are the glass temperatures of the respective homopolymers thereof, in degrees Kelvin.

The novel rubbery compositions embodied herein are obtained by polymerizing the aforedescribed monomeric mixture in an inert liquid medium, e.g., in aqueous emulsion or in solution or in bulk. The polymerization system should contain a free radical catalyst which may be of the water-soluble type or of the monomer-soluble class. Suitable free-radical initiators include the persulfates, oxides, the peroxides, hydroperoxides, azo compounds, the redox catalysts, and the like. The alkyl borane-peroxide catalyst systems disclosed in U.S. Patent No. 3,025,284 give good results. The preferred catalysts for the aqueous systems are the well known redox systems, while the preferred catalysts for solution systems are organic peroxides. The free radical catalyst concentration ranges from about 0.01 to 0.2 part per 100 parts by weight of monomers with from about 0.05 to 0.1 part being most preferred.

When the aqueous emulsion technique is used to prepare the polymers of this invention, the reaction mixture normally contains on the order of about 80 to 150 parts of water and about 0.1 to 2.5 parts of a conventional emulsifying agent per 100 parts by weight of monomers. The pH of the system generally is about 7.5 and below. The emulsifier may be anionic, cationic or nonionic; however, the anionic type is preferred, for example, sodium stearate, potassium laurate, morpholine oleate, sodium lauryl sulfate, sodium alkyl naphthalene sulfonate, glycerol monostearate containing a soap, and the like. Representative cationic emulsifying agents include the long chain quaternary salts such as cetyltriethylammonium chloride, the alkyl dimethylbenzylammonium chlorides, and the like. Nonionic emulsifiers include for example, the polyoxyethylene fatty alcohol ethers, polyglycol fatty acid esters, polyoxyethylene modified fatty acid esters and the like.

Suitable solvents for solution polymerization are tert-butyl alcohol, chlorobenzene, carbon tetrachloride, acetone, cyclohexane, benzene, ethyl acetate, toluene, methyl ethyl ketone and others with low chain transfer constants.

Conventional polymerization operating procedures may be used in the production of the interpolymers, either the batch-charging technique or the continuous technique.

The emulsion system reaction temperature may be within the range of 0 to 100° C., with from about 20 to about 40° C. being preferred. The preferred temperature for a solution polymerization is within the range of about 20 to 70° C.

It is economically desirable to carry the polymerization to a 90 to 100% conversion. In the emulsion system from about 2 to 10 hours are required to attain such yields, and in the solution system from 2 to 24 hours of reaction time are necessary, depending, of course, on catalyst concentration and temperature. Despite the longer reaction period normally required, the solution polymerization method is sometimes preferred over the emulsion method because there is better distribution in the interpolymer of any monomer constituents having measurable water solubility and the "solution elastomers" are also relatively less corrosive.

Subsequent to polymerization, the rubber is separated from the diluent by freeze coagulation or by agglomeration with a conventional coagulating reagent followed by filtration.

While the defined polyacrylate rubbers are self-curing and can be cured by heating alone, improved vulcanization is brought about by heating the interpolymer in admixture with an acid catalyst. The curing reaction is not uncontrollably fast as is the case with most other self-curing interpolymers and the rate can be controlled to a large extent by adjusting the cure temperature (250 to 450° F.) and/or the strength and amount of the acid catalyst.

Acid catalyst concentration is generally from about 0.1 to 3–5 parts per 100 parts by weight of rubber and when no catalyst is present, the rate of cure is very slow. Typical acid catalysts are butadiene sulfone, toluene sulfonic acid, morpholinium toluene sulfonate, salicylic acid, benzoic acid, stearic acid and the like.

The raw polymer is compounded with the curing catalyst and other well-known rubber compounding agents such as fillers, pigments, lubricants and the like in a conventional rubber mixing apparatus such as a roll-mill or Banbury mixer operated at from about 70 to 250° F. It has also been found to be advantageous to include in the compounding formula from about 0.1 to 5 parts by weight of a polyalkylene glycol per 100 parts by weight of rubber. The heat aging properties of vulcanizates containing such polyalkylene glycols are superior to those observed for vulcanizates not containing the polyalkylene glycols. Polyalkylene glycols useful herein include polymethylene oxide glycol, polyethylene oxide glycol, polypropylene oxide glycol, polytetramethylene oxide glycol and generally alkylene glycols having the structure HO(R$_7$—O)$_n$H wherein R$_7$ is an alkylene group having from 1 to 8 carbon atoms and $n$ is a whole number greater than 1. A more detailed description of the more common polyalkylene glycols is given in "Encyclopedia of Chemical Technology" by Kirk and Othmer, Interscience Encyclopedia, Inc., New York, N.Y., 1951, vol. 7, particularly pp. 257–263.

The interpolymers of this invention thus have the following advantages over other acrylate rubbers: they have improved precure shelf-life; no toxic or odoriferous curatives are required; the cure system is non-corrosive; the curative is non-fugitive; there is no need for an external vulcanization agent; a delayed action cure is obtainable; for example, the rubber may be milled for thirty minutes or more at 150° F. without any appreciable curing thereof and yet will cure in 10 to 20 minutes at 350° F.; the rubbers have improved processing and milling characteristics due to their low gel contents and favorable scorch characteristics.

The tests on the cured or vulcanized rubbers were made in accordance with ASTM procedures.

For purposes of brevity in the tables of data, symbols are used to designate the various monomers used in preparing the interpolymers of the illustrative examples, in accordance with the following nomenclature.

NMA _____ N-methylol acrylamide.
NMMA _____ N-methoxymethyl acrylamide.
NEMA _____ N-ethoxymethyl acrylamide.
NiPMA _____ N-isopropoxymethyl acrylamide.
NBMA _____ N-n-butoxymethyl acrylamide.
NiBMA _____ N-isobutoxymethyl acrylamide.
NAMA _____ N-n-pentoxymethyl acrylamide.
NiAMA _____ N-isopentoxymethyl acrylamide.
NOMA _____ N-n-octyloxymethyl acrylamide.
AC _____ Acrylamide.
MAC _____ Methacrylamide.
MeA _____ Methyl acrylate.
EtA _____ Ethyl acrylate.
n-BuA _____ n-Butyl acrylate.
2-CNEA _____ β-Cyano ethyl acrylate.
VCN _____ Acrylonitrile.

EXAMPLE I

A series of self-curing ethyl acrylate interpolymers were made using the following conventional emulsion polymerization recipe.

|  | Parts |
|---|---|
| Monomers | 100 |
| Water | 100 |
| Emulsifier (anionic) | 2.3 |
| Iron complex of organic chelating agent | 0.02 |
| Organic hydroperoxide | 0.07 |
| Reducing agent | 0.07 |
| Electrolyte (Na$_2$SO$_4$) | 0.3 |

The polymerization procedure was as follows: 55 parts of water, 0.5 part of the emulsifying agent, and the electrolyte and catalyst were charged into the polymerization vessel which was maintained under a blanket of nitrogen. An emulsion comprised of the monomers and the remaining water and emulsifier was prepared in another vessel. 5% of this emulsified mixture was added to the reactor, and after a temperature rise therein indicated the initiation of polymerization, the remainder was proportioned in over a two to eight hour period. The reaction was continued at 20 to 40° C. until the conversion was at least 95%. The conversions of monomer to polymer averaged about 98%.

The latex was coagulated by adding it to a 10% NaCl solution with violent agitation. The rubber crumb was recovered by filtration, water washed, and dried in vacuum oven at 200 to 220° F. Several physical tests were performed on specimens of the raw rubber.

The low gel-content rubber was compounded on a roll mill at about 70 to 200° F. for 20 minutes employing the following recipe:

|  | Parts |
|---|---|
| Rubber | 100 |
| FEF (fast extruding furnace) carbon black | 40 |
| Stearic acid | 1 |
| Polyethylene glycol, average molecular weight of 3,000–3,700 | 2 |

The exception was sample 5 wherein the compounding recipe contained 5 parts of "Dixie Clay," an acidic kaolin mineral filler, as an acid catalyst and filler.

The compounded rubber was subjected to various cure periods and physical tests. The data for this series of experiments are presented in Table A. The symbol (—) in a table indicates the measurement was not made. The results confirm a sharp drop in elastomer quality, as indicated by a marked reduction in the elongation of the cured samples, when the reactive monomer (self-cure constituents) contents of the interpolymers exceed the given limits.

A rubbery interpolymer consisting of 97 parts of ethyl acrylate, 1 part of acrylamide and 2 parts of N-methylol acrylamide (NMA) was prepared according to the aforesaid procedures. The gel content of the rubber was 97%. The rubber was compounded and cured substantially as described above, and after 3 days of air aging at 350° F., the tensile strength of the elastomer was only 200 lbs./sq. in. It has also been found that rubbery interpolymers which are composed of 96 to 99% ethyl acrylate and correspondingly 1 to 4% of NMA exhibit premature vulcanization (scorch) during compounding on the roll mill, showing that these rubbers have unacceptably fast rates of cure. An interpolymer composed of 96.5% of ethyl acrylate and 3.5% of acrylamide (there was no substituted amide in the composition) had a gel content of 97.3%. A sample thereof which was compounded substantially as described above had a tensile of only 300 lbs./sq. in. after 3 days of air aging at 350° F. Comparison of these results with the properties of the elastomers of this invention illustrates the pronounced and unexpected improvements in the rubbers containing the reactive curing comonomers disclosed herein.

TABLE A

| | Monomer Mixture, Parts | | | | | Raw Rubber | | Physical Properties of Compounded Elastomer | | | | |
|---|---|---|---|---|---|---|---|---|---|---|---|---|
| | | | | | | | | | Mooney Scorch Value at 280° F. | | 10 minutes at 350° F. in press | | |
| | EtA | NBMA | AC | MAC | DSV[1] | Percent Gel | Mooney Viscosity | Δ5 points | Δ30 points | Tensile | Elong. | Hardness |
| Sample: | | | | | | | | | | | | |
| 1 | 99 | 0.5 | 0.5 | | 2.37 | 0.8 | 46 | >30 | | 500 | >1,200 | 52 |
| 2 | 98 | 1.0 | 1.0 | | 2.49 | 2.6 | 46 | >22.5 | 31 | 1,050 | >1,060 | 50 |
| 3 | 98 | 1.0 | | 1.0 | 2.68 | 1.6 | 44 | 20.5 | 28 | 1,250 | 860 | 50 |
| 4 | 98.2 | 0.9 | 0.9 | | 2.21 | 1.2 | 43 | 9 | 12 | 1,400 | 600 | 52 |
| 5 | 97 | 1.5 | 1.5 | | 2.68 | 0.0 | 45 | 21.3 | 30 | 1,200 | 980 | 51 |
| 6 | 97 | 1.5 | | 1.5 | 2.87 | 1.2 | 41 | 16 | 22 | 1,400 | 650 | 52 |
| 7 | 95 | 5.0 | | | 2.78 | 1.1 | 41 | 11.5 | 16 | 1,350 | 570 | 52 |
| 8 | 95 | 2.5 | 2.5 | | 2.37 | 0.7 | 46 | 16 | 22 | 1,350 | 610 | 54 |

See footnote at end of table.

TABLE A—Continued

| | Physical Properties of Compounded Elastomer | | | | | | | | |
|---|---|---|---|---|---|---|---|---|---|
| | Tempered 3 hours at 350° F. | | | | | | Aged 3 days in air at 350° F. | | |
| | Tensile | Elong. | Hardness | 100% Mod. | 300% Mod. | Compression set | Tensile | Elong. | Hardness |
| Sample: | | | | | | | | | |
| 1 | 950 | 1,030 | 52 | 110 | 340 | 28 | 500 | >1,100 | 53 |
| 2 | 1,000 | 820 | 50 | 110 | 370 | 48 | 650 | >1,100 | 53 |
| 3 | 1,400 | 420 | 58 | 230 | 1,060 | 31 | 1,450 | 420 | 56 |
| 4 | 1,350 | 470 | 55 | 200 | 980 | 22 | 1,250 | 520 | 57 |
| 5 | 1,500 | 320 | 58 | 350 | 1,410 | 25 | 1,450 | 390 | 58 |
| 6 | 1,500 | 280 | 59 | 420 |  | 22 | 1,700 | 260 | 63 |
| 7 | 1,500 | 260 | 60 | 410 | 1,140 | 26 | 1,550 | 280 | 61 |
| 8 | 1,350 | 310 | 57 | 340 | 1,340 | 38 | 1,500 | 320 | 58 |
| 9 | 1,250 | 160 | 63 | 650 |  | 41 | 1,700 | 190 | 65 |
| 10 | 1,200 | 80 | 72 |  |  | 44 | 1,600 | 100 | 73 |
| 11 | 1,400 | 130 | 68 | 1,050 |  | 20 | 1,750 | 130 | 71 |

[1] In 0.4% dimethyl formamide solution.

EXAMPLE II

In this series of experiments the method of polymerization and compounding technique and recipe described in Example I were repeated for interpolymers of several lower alkyl esters of acrylic acid, N-butoxymethyl acrylamide and acrylamide. The data are summarized in Table B.

95% ethyl acrylate and 5% chloroethyl vinyl ether, is inserted for comparative purposes.

The method of polymerization for these interpolymers was the emulsion technique described in Example I using essentially the same recipe. The compounding recipe and

TABLE B

| | Monomer Mixture, Parts | | | | | | Raw Rubber | | |
|---|---|---|---|---|---|---|---|---|---|
| | EtA | N-BuA | 2-CNEA | VCN | NBMA | AC | DSV [1] | Gel, Percent | Mooney Viscosity |
| Sample: | | | | | | | | | |
| 12 | 97.8 |  |  |  | 1.2 | 1.0 | 1.84 | 0.0 | 37 |
| 13 | 72 | 25 |  | 1.0 | 1.15 | 0.85 | 1.97 | 1.8 | 36 |
| 14 |  | 82.8 | 15.0 |  | 1.2 | 1.0 | 2.25 | 5.2 | 21 |
| 15 |  | 97.8 |  |  | 1.2 | 1.0 | 2.43 | 4.8 | 23 |
| 16 |  | 86.8 |  | 11.0 | 1.2 | 1.0 | 2.50 | 0.9 | 32 |
| 17 |  | 72.8 | 25.0 |  | 1.2 | 1.0 | 3.22 | 0.0 | 27 |

| | Physical Properties of Compounded Elastomer | | | | | | |
|---|---|---|---|---|---|---|---|
| | Tempered 3 hours at 350° F. | | | | Aged 70 hrs. in air at 350° F. | | |
| | Tensile | Elong. | Hardness | Compression set | Tensile | Elong. | Hardness |
| Sample: | | | | | | | |
| 12 | 1,200 | 350 | 56 | 25 | 1,200 | 350 | 66 |
| 13 | 1,200 | 350 | 55 | 34 | 1,050 | 340 | 53 |
| 14 | 950 | 280 | 44 | 40 | 700 | 150 | 57 |
| 15 | 650 | 360 | 38 | 47 | 600 | 560 | 36 |
| 16 | 1,250 | 580 | 55 | 56 | 950 | 360 | 58 |
| 17 | 1,050 | 650 | 41 |  | 1,050 | 140 | 66 |

| | Physical Properties of Compounded Elastomer | | | | |
|---|---|---|---|---|---|
| | Mooney Scorch Value [2] | | 10 minutes at 350° F. in press | | |
| | Δ 5 points | Δ 30 points | Tensile | Elong. | Hardness |
| Sample: | | | | | |
| 12 | 13.5 | 18.8 | 1,100 | 680 | 50 |
| 13 | 9.5 | 13.5 | 850 | 1,030 | 43 |
| 14 | 13.5 | 20.0 | 600 | 740 | [3] 34 |
| 15 |  |  | 650 | 360 | 38 |
| 16 |  |  | 1,000 | 440 | 53 |
| 17 | 12.3 | 18.5 |  |  |  |

[1] In 0.4% dimethyl formamide solution.
[2] At 300° F. except Sample 12 which was at 280° F.
[3] No polyethylene glycol in compounding recipe.

EXAMPLE III

The interpolymers of this example (Table C) are composed of ethyl acrylate, acrylamide and various N-alkoxymethyl acrylamides. Data relating to a commercial acrylate rubber, "Hycar 4021" (a product of The B. F. Goodrich Chemical Company) which is an interpolymer of technique were also those as shown in Example I. The compounding recipe for the Hycar 4021 was as follows:

| | Parts |
|---|---|
| Hycar 4021 rubber | 100 |
| FEF carbon black | 40 |
| Stearic acid | 1 |
| Triethylenetetramine | 1.5 |
| Benzothiazyl disulfide | 2 |

TABLE C

| Sample | Monomer Mixture, Parts | | | Raw Rubber | | | Mooney Viscosity | Mooney Scorch Value at 280° F. | | Physical Properties of Compounded Elastomer | | | | | | | | |
|---|---|---|---|---|---|---|---|---|---|---|---|---|---|---|---|---|---|
| | EtA | AC | Alkoxymethyl acrylamide | DSV[1] | Gel, percent | | | Δ5 points | Δ30 points | 10 minutes at 350° F. in press | | | Tempered 3 hrs. at 350° F. | | Aged 70 hrs. in air at 350° F. | | | |
| | | | | | | | | | | Tensile | Elong. | Hardness | 100% Mod. | 300% Mod. | Tensile | Elong. | Hardness |
| 18 | 98.3 | 0.9 | 0.8 NMMA | 2.33 | 4.0 | | 54 | >30 | >30 | 1,200 | 410 | 50 | 200 | 910 | 900 | 650 | 55 |
| 19 | 98.2 | 0.9 | 0.9 NEMA | 1.79 | 1.8 | | 41 | >30 | >30 | 1,350 | 450 | 56 | 230 | 1,000 | 950 | 530 | 55 |
| 20 | 98.1 | 0.9 | 1.0 NiPMA | 2.18 | 0.0 | | 41 | 17 | 26 | 1,200 | 450 | 58 | 210 | 920 | 950 | 500 | 56 |
| 21 | 98.0 | 0.9 | 1.1 NBMA | 2.39 | 1.0 | | 50 | 25 | >30 | 1,450 | 360 | 58 | 250 | 1,190 | 1,300 | 380 | 56 |
| 22 | 97.9 | 0.9 | 1.2 NAMA | 1.89 | 0.6 | | 47 | 28 | >30 | 1,350 | 360 | 55 | 250 | 1,110 | 1,150 | 510 | 54 |
| 23 | 97.9 | 0.9 | 1.2 NiAMA | 2.70 | 2.7 | | 40 | 27.5 | >30 | 1,250 | 380 | 55 | 250 | 1,050 | 1,100 | 500 | 55 |
| 24[2] | | | | 1.85 | 0.0 | | 50 | 10 | 13.5 | 1,450 | 250 | 55 | 350 | | | 160 | 75 |

[1] In 0.4% dimethyl formamide solution.  [2] Hycar 4021.

EXAMPLE IV

The data for this example are summarized in Table D. The rubbers were ethyl acrylate/acrylamide/N-butoxymethyl acrylamide interpolymers, except for sample 29 in which the self-cure monomer was N-octyloxymethyl acrylamide. The interpolymers were prepared in a batch-charged emulsion system, using quart "pop bottles" tumbled in a constant temperature bath. The following recipe was employed:

| | Parts |
|---|---|
| Monomers | 100 |
| Water (distilled) | 200 |
| Sodium lauryl sulfate (emulsifier) | 3 |
| Sodium hydrosulfite (reducing agent) | 0.04 |
| Sodium formaldehyde sulfoxalate (reducing agent) | 0.24 |
| p-Menthane hydroperoxide (catalyst) | 0.1 |

Polymerization was at 50° C. except for the sample 29 run which was at 30° C. High conversions were obtained in less than 2 hours. The latices were coagulated with vigorous stirring by adding methanol thereto; the rubber crumb was recovered by filtration, water washed, and dried at 30° C. in a vacuum oven. The compounding was performed on a laboratory roll-mill at 100 to 150° F. with this recipe:

| | Parts |
|---|---|
| Rubber | 100 |
| HAF (high abrasion furnace) carbon black | 50 |
| Acid curing catalyst, butadiene sulfone or stearic acid | 0.3–1.0 |

TABLE D

| Sample | Monomer Mixture, Parts | | | Raw Rubber | | | Polymerization Conversion, percent | Curing Catalyst, Parts | | Physical Properties of Compounded Elastomer | | | | | | | | | | | | |
|---|---|---|---|---|---|---|---|---|---|---|---|---|---|---|---|---|---|---|---|---|---|---|
| | EtA | NBMA | AC | DSV[1] | Gel, percent | | | Butadiene sulfone | Stearic Acid | After 45 minutes at 305° F. in press | | | | | Tempered 24 hours at 300° F. | | | | | Aged 3 days in air at 350° F. | | |
| | | | | | | | | | | 100% Mod. | 300% Mod. | Tensile | Elong. | Hardness | 100% Mod. | 300% Mod. | Tensile | Elong. | Hardness | 100% Mod. | 300% Mod. | Tensile | Elong. | Hardness |
| 25 | 98 | 2 | 0 | 5.4 | <1 | | 97.6 | | 1.0 | 175 | 325 | 475 | 595 | 60 | 480 | 1,800 | 2,290 | 390 | 70 | 225 | 590 | 825 | 490 | 77 |
| 26 | 97.6 | 2 | 0.4 | 4.5 | 0 | | 86.4 | | 1.0 | 200 | 400 | 725 | 720 | 65 | 480 | 1,800 | 2,290 | 390 | 70 | 325 | 1,125 | 1,600 | 955 | 85 |
| 27 | 97.2 | 2 | 0.8 | 4.5 | 0 | | 95.5 | 0.3 | | 400 | | 1,400 | 290 | 70 | 1,130 | | 1,905 | 160 | 76 | 200 | 375 | 625 | 730 | 80 |
| 28a | 96.4 | 2 | 1.6 | 4.2 | 0 | | 96.6 | 0.3 | | 500 | 1,300 | 1,900 | 470 | 75 | 1,100 | | 2,100 | 205 | 80 | 300 | 450 | 650 | 780 | 80 |
| 28b | | | | | | | | | | 275 | | 1,450 | 550 | 75 | 680 | 1,500 | 2,100 | 180 | 85 | 500 | 1,250 | 1,500 | 390 | 90 |
| 29 | 97 | (2) | | 4.1 | <5 | | 97 | | 0.5 | | | 100 | 670 | 50 | 400 | | 1,950 | 360 | 67 | 275 | 900 | 1,150 | 420 | 75 |

[1] In 0.2% toluene solution.  [2] 2 parts NOMA.

EXAMPLE V

In this series of experiments the recipes and procedures were the same as in the previous example except that the acrylamide component of the interpolymer was replaced by methacrylamide. The results are summarized in Table E. The Gehman freeze points of the elastomers were −16 to −17° C.

TABLE E

| Sample | Monomer Mixture, Parts | | | Conversion, Percent | Raw Rubber | | Curing Catalyst, Parts | |
|---|---|---|---|---|---|---|---|---|
| | EtA | NBMA | MAC | | DSV[1] | Gel, Percent | Butadiene Sulfone | Stearic Acid |
| 30a | 97.6 | 2 | 0.4 | 93.2 | 4.9 | 0 | 0.3 | 1.0 |
| 30b | | | | | | | 0.3 | |
| 31a | 97.2 | 2 | 0.8 | 91.6 | 4.6 | 0 | 0.3 | 1.0 |
| 31b | | | | | | | 0.3 | |
| 32a | 96.4 | 2 | 1.6 | 93.6 | 3.9 | ([2]) | 0.3 | 1.0 |
| 32b | | | | | | | 0.3 | |
| 33a | 96 | 2 | 2 | 94.2 | 4.0 | ([2]) | 0.3 | 1.0 |
| 33b | | | | | | | 0.3 | |

Physical Properties of Compounded Elastomer

| Sample | After 45 minutes at 350° F. in press | | | | | Tempered 24 hours at 300° F. | | | | |
|---|---|---|---|---|---|---|---|---|---|---|
| | 100% Mod. | 300% Mod. | Tensile | Elong. | Hardness | 100% Mod. | 300% Mod. | Tensile | Elong. | Hardness |
| 30a | 190 | | 300 | 685 | 65 | 325 | 1,250 | 2,100 | 475 | 69 |
| 30b | 225 | 800 | 1,890 | 590 | 65 | 700 | | 2,100 | 225 | 64 |
| 31a | 175 | 325 | 635 | 830 | 65 | 475 | 1,800 | 2,100 | 355 | 75 |
| 31b | 310 | 1,250 | 2,150 | 470 | 67 | 1,100 | | 2,250 | 180 | 71 |
| 32a | 250 | 600 | 1,170 | 695 | 65 | 550 | | 1,900 | 260 | 80 |
| 32b | 400 | 1,500 | 2,150 | 430 | 67 | 1,100 | | 2,050 | 165 | 72 |
| 33a | 225 | 550 | 1,025 | 660 | 70 | 625 | 2,050 | 2,200 | 325 | 80 |
| 33b | 400 | 1,450 | 2,200 | 450 | 68 | 1,050 | | 2,150 | 200 | 75 |

Physical Properties of Compounded Elastomer

| Sample | Aged 3 days in air at 350° F. | | | | | 3 days at 300° F. in ASTM No. 3 Oil | | | | |
|---|---|---|---|---|---|---|---|---|---|---|
| | 100% Mod. | 300% Mod. | Tensile | Elong. | Hardness | 100% Mod. | 300% Mod. | Tensile | Elong. | Hardness |
| 30a | 250 | 800 | 1,325 | 515 | 71 | 175 | 700 | 1,800 | 630 | 45 |
| 30b | 100 | 250 | 500 | 700 | 75 | 200 | 1,225 | 1,800 | 430 | 46 |
| 31a | 400 | 750 | 1,550 | 400 | 80 | 225 | 1,050 | 1,800 | 520 | 50 |
| 31b | 250 | 690 | 1,100 | 560 | 80 | 300 | 1,550 | 1,900 | 370 | 50 |
| 32a | 400 | 1,300 | 1,550 | 355 | 80 | 350 | 1,375 | 800 | 350 | 55 |
| 32b | 200 | 700 | 1,175 | 580 | 80 | 400 | 1,900 | 2,100 | 400 | 55 |
| 33a | 450 | 1,100 | 1,300 | 385 | 85 | 350 | 1,350 | 1,940 | 450 | 56 |
| 33b | 300 | 800 | 1,200 | 545 | 80 | 375 | 1,500 | 2,025 | 420 | 55 |

TABLE E—(Continued)

Physical Properties of Compounded Elastomer

| Sample | 3 days at 300° F. in ASTM No. 3 Oil, Volume swell, percent | Compression set, on specimen aged 70 hrs. at 300° F. |
|---|---|---|
| 30a | 18.8 | 67 |
| 30b | 19.8 | 48 |
| 31a | 18.7 | 58 |
| 31b | 18.9 | 46 |
| 32a | 17.6 | 55 |
| 32b | 17.6 | 43 |
| 33a | 17.0 | 54 |
| 33b | 17.1 | 41 |

[1] In 0.2% toluene solution.
[2] 2 parts NOMA.

EXAMPLE VI

The procedures described in Example IV were repeated for acrylate interpolymers of different composition; the data are shown in Table F.

TABLE F

| Sample | Monomer Mixture, Parts | | | | Conversion, Percent | Raw Rubber | | Curing Catalyst, Parts | |
|---|---|---|---|---|---|---|---|---|---|
| | BuA | 2-CNEtA | VCN | NBMA | | DSV[1] | Gel, Percent | Butadiene Sulfone | Stearic Acid |
| 34a | 83 | 15 | | 2 | 90 | 3.4 | 0 | 0.3 | 2.0 |
| 34b | | | | | | | | | |
| 35 | 86 | | 12 | 2 | 92.3 | 3.0 | 0 | 0.24 | |

| | Physical Properties of Compounded Elastomer | | | | | | | | |
|---|---|---|---|---|---|---|---|---|---|
| | After 45 minutes at 350° F. in press | | | | | Tempered 24 hours at 300° F. | | | |
| Sample | 100% Mod. | 300% Mod. | Tensile | Elong. | Hardness | 100% Mod. | Tensile | Elong. | Hardness |
| 34a | 100 | 200 | 275 | 780 | 44 | 200 | 1,550 | 415 | 60 |
| 34b | 175 | 500 | 1,050 | 545 | 80 | 300 | 1,200 | 260 | 65 |
| 35 | 175 | 550 | 1,000 | 645 | 65 | 400 | 2,250 | 330 | 70 |

| | Physical Properties of Compounded Elastomer | | | | | | | | |
|---|---|---|---|---|---|---|---|---|---|
| | Aged 3 days at 350° F. in air | | | | 3 days at 300° F. in ASTM No. 3 Oil | | | | Compression set, 70 hrs. at 300° F. |
| Sample | 100% Mod. | Tensile | Elong. | Hardness | 100% Mod. | Tensile | Elong. | Hardness | |
| 34a | 300 | 925 | 245 | 70 | 100 | 860 | 390 | 30 | |
| 34b | 210 | 950 | 295 | 68 | 74 | 600 | 290 | 32 | 38.3 |
| 35 | 425 | 1,625 | 275 | 70 | 175 | 1,200 | 300 | 40 | 40.9 |

EXAMPLE VII

A group of interpolymers were prepared in tertiary-butyl alcohol solvent in quart bottles using the following reaction mixture.

|   | Parts |
|---|---|
| Monomers | 100 |
| t-Butanol | 208 |
| Triisobutyl boron | 0.13 |
| Hydrogen peroxide (30% aqueous solution) | 0.4 |

The bottles were tumbled in a constant temperature bath at 30° C. for about 20 hours to attain monomer conversions of 85-95%. The resulting polymer solutions were very viscous but still pourable. Polymer recovery was not difficult. The solution was diluted with additional t-butanol solvent, the polymer was partially precipitated by the addition of methanol and completely precipitated by adding water. The rubber crumb was separated from the liquid by filtration, water washed, and dried in a vacuum oven at 30° C. It was compounded on a roll mill as described in Example IV. Data pertinent to the experiments of the present example are found in Table G. The elastomers had Gehman freeze temperatures of —16 to —17° C. An interpolymer comprised of 98% ethyl acrylate, 0.9% of acrylamide and 1.1% of N-butoxymethyl acrylamide was prepared in n-butyl alcohol solvent in the same manner as the other interpolymers of this example. The interpolymer produced in this high chain transfer solvent was a liquid, and not a rubber, indicating a low-molecular weight material.

TABLE G

| Sample | Monomer Mixture Parts | | | | Raw Polymer | | Curing Catalyst Parts | |
|---|---|---|---|---|---|---|---|---|
| | ETA | NBMA | AC | MAC | DSV[1] | Gel percent | Butadiene Sulfone | Stearic Acid |
| 36 | 98.4 | 1.6 | | | 2.91 | 0 | 0.24 | |
| 37 | 98 | 2 | | | 4.42 | 0 | 0.24 | |
| 38 | 97.6 | 2 | 0.4 | | 2.54 | 0 | | 1.0 |
| 39 | 97.2 | 2 | 0.8 | | 2.38 | 0 | | 1.0 |
| 40 | 97.8 | 2 | | 0.2 | 1.96 | 0 | 0.3 | |
| 41a | 97.6 | 2 | | 0.4 | 1.95 | 0 | 0.3 | 1.0 |
| 41b | | | | | | | | |
| 42 | 96.4 | 2 | | 1.6 | 3.62 | 0 | | 1.0 |

| | Physical Properties of Compounded Elastomer | | | | | | | | |
|---|---|---|---|---|---|---|---|---|---|
| | After 45 minutes at 350° F. in press | | | | | Tempered 24 hours at 300° F. | | | |
| Sample | 100% Mod. | 300% Mod. | Tensile | Elong. | Hardness | 100% Mod. | 300% Mod. | Tensile | Elong. | Hardness |
| 36 | 75 | 225 | 450 | 820 | 62 | 220 | 1,220 | 1,950 | 470 | 65 |
| 37 | 125 | 430 | 1,175 | 700 | 62 | 325 | 1,950 | 2,475 | 375 | 65 |
| 38 | 50 | 200 | 875 | 775 | 51 | 300 | 1,675 | 2,300 | 395 | 65 |
| 39 | 175 | 550 | 1,400 | 710 | 55 | 400 | 2,125 | 2,400 | 350 | 66 |
| 40 | 200 | 800 | 1,900 | 590 | 58 | 450 | 2,050 | 2,250 | 330 | 70 |
| 41a | 100 | 250 | 350 | 760 | 55 | 325 | 1,350 | 1,930 | 405 | 70 |
| 41b | 200 | 950 | 1,950 | 515 | 55 | 475 | | 2,100 | 290 | 72 |
| 42 | 150 | 600 | 1,900 | 700 | 58 | 500 | | 2,400 | 290 | 70 |

| | Physical Properties of Compounded Elastomer | | | | | | | | |
|---|---|---|---|---|---|---|---|---|---|
| | Aged 3 days in air at 350° F. | | | | | 3 days at 300° F. in ASTM No. 3 Oil | | | |
| Sample | 100% Mod. | 300% Mod. | Tensile | Elong. | Hardness | 100% Mod. | 300% Mod. | Tensile | Elong. | Hardness |
| 36 | 100 | 375 | 650 | 615 | 69 | | | | | |
| 37 | 200 | 930 | 1,350 | 450 | 70 | | | | | |
| 38 | 290 | 1,200 | 1,500 | 365 | 70 | 100 | 400 | 1,600 | 520 | 40 |
| 39 | 400 | 1,590 | 1,650 | 310 | 75 | 175 | 1,100 | 1,900 | 490 | 43 |
| 40 | | | | | | 100 | 600 | 1,400 | 540 | 40 |
| 41a | 200 | 775 | 1,150 | 445 | 70 | 150 | 70 | 1,440 | 550 | 40 |
| 41b | | | | | | 150 | 900 | 1,400 | 450 | 40 |
| 42 | 375 | 1,750 | 1,825 | 315 | 75 | 260 | 1,450 | 1,940 | 390 | 50 |

See footnote at end of table.

TABLE G—(Continued)

| | Physical Properties of Compounded Elastomer | |
|---|---|---|
| | 3 days at 300° F. in ASTM No. 3 Oil, Volume swell, percent | Compression set, on specimen aged 70 hrs. at 300° F. |
| Sample: | | |
| 36 | | 37 |
| 37 | | 33 |
| 38 | 19.5 | 56 |
| 39 | 18.8 | 50 |
| 40 | 20.3 | 30 |
| 41a | 20.3 | 58 |
| 41b | 19.9 | 37 |
| 42 | 17.8 | 44 |

[1] In 0.2% toluene solution.

We claim:

1. A composition comprising (1) a rubbery interpolymer comprising (A) a major proportion of an acrylic acid ester of the formula

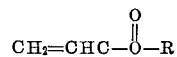

wherein R is a member of the class consisting of alkyl groups containing 2 to 8 carbon atoms, beta-cyanoethyl and cyanoalkyl groups containing from 4 to 8 carbon atoms; (B) from 0.2 to 2.5% by weight of an N-substituted alkoxy methyl acrylamide of the formula

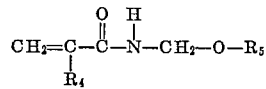

wherein $R_4$ is hydrogen or methyl and $R_5$ is an alkyl group containing 2 to 5 carbon atoms; and (C) from 0.2 to 3.8% by weight of an amide of the formula

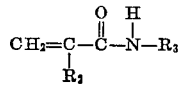

wherein $R_2$ is hydrogen or methyl and $R_3$ is an alkyl group containing 1 to 6 carbon atoms, wherein the total of N-substituted alkoxy methyl acrylamide (B) and other amide (C) present in the interpolymer do not exceed 4 total percent by weight, said rubbery interpolymer being further characterized by having a glass temperature Tg not greater than 10° C., and (2) 0.1 to 5 parts by weight per 100 of (1) of an organic acid, selected from the group consisting of aromatic carboxylic acids, sulfonic acids and fatty acids containing 12 to 18 carbon atoms and 0.1 to 5 parts by weight of a polyalkylene glycol.

2. The composition of claim 1 wherein component (A) is an alkyl acrylate wherein the alkyl radical contains 2 to 4 carbon atoms, component (B) is N-butoxymethyl acrylamide, and component (C) is selected from the group consisting of acrylamide and methacrylamide.

3. The composition of claim 1 heated to a temperature of about 250° to 450° F. to provide a vulcanized product.

4. The composition of claim 2 heated to a temperature of about 250° to 450° F. to provide a vulcanized product.

5. The composition of claim 2 wherein the organic acid is stearic acid and the glycol is polyethylene glycol in total amount from 0.1 to 5 parts per 100 of interpolymer.

References Cited

UNITED STATES PATENTS 2,492,170 12/1949 Mast et al. _____ 260—86.1
3,240,740 3/1966 Knapp et al. _____ 260—29.6
3,315,012 4/1967 Jorgensen et al. _____ 260—851

OTHER REFERENCES

Compounding Ingredients for Rubber, 3rd ed. 1961, Rubber World, 630 3rd Ave., New York, N.Y., p. 404.

JOSEPH L. SCHOFER, *Primary Examiner.*

STANFORD M. LEVIN, *Assistant Examiner.*

U.S. Cl. X.R.

260—41, 78.5, 79.5, 80.73, 86.1, 89.5